United States Patent
Rose et al.

(10) Patent No.: US 9,536,524 B2
(45) Date of Patent: *Jan. 3, 2017

(54) SYSTEMS AND METHODS FOR DYNAMIC RE-CONFIGURABLE SPEECH RECOGNITION

(71) Applicant: AT&T Intellectual Property II, L.P., Atlanta, GA (US)

(72) Inventors: Richard C. Rose, Westmount (CA); Bojana Gajic, Trondheim (NO)

(73) Assignee: AT&T Intellectual Property II, L.P., Atlanta, GA (US)

(*) Notice: Subject to any disclaimer, the term of this patent is extended or adjusted under 35 U.S.C. 154(b) by 289 days.

This patent is subject to a terminal disclaimer.

(21) Appl. No.: 14/267,133

(22) Filed: May 1, 2014

(65) Prior Publication Data

US 2014/0244251 A1    Aug. 28, 2014

Related U.S. Application Data

(63) Continuation of application No. 12/120,801, filed on May 15, 2008, now Pat. No. 8,719,017, which is a
(Continued)

(51) Int. Cl.
*G10L 15/00* (2013.01)
*G10L 15/20* (2006.01)
(Continued)

(52) U.S. Cl.
CPC ............... *G10L 15/20* (2013.01); *G10L 15/10* (2013.01); *G10L 15/142* (2013.01)

(58) Field of Classification Search
CPC ....... G10L 15/06; G10L 15/063; G10L 15/065; G10L 15/07; G10L 15/075; G10L 15/20; G10L 17/04
(Continued)

(56) References Cited

U.S. PATENT DOCUMENTS 4,597,098 A    6/1986   Noso et al.
4,679,228 A    7/1987   Korsky et al.
(Continued)

FOREIGN PATENT DOCUMENTS

DE    4139610    7/1993
EP    0298621    1/1989
(Continued)

OTHER PUBLICATIONS

Anastasakos T et al: "A compact model for speaker-adaptive training" Proceedings International Conference on Spoken Language Processing (ICSLP '96), Philadelphia, PA, USA, vol. 2, Oct. 3-6, 1996, pp. 1137-1140, XP002121818.
(Continued)

*Primary Examiner* — Paras D Shah

(57) ABSTRACT

Speech recognition models are dynamically re-configurable based on user information, background information such as background noise and transducer information such as transducer response characteristics to provide users with alternate input modes to keyboard text entry. The techniques of dynamic re-configurable speech recognition provide for deployment of speech recognition on small devices such as mobile phones and personal digital assistants as well environments such as office, home or vehicle while maintaining the accuracy of the speech recognition.

18 Claims, 5 Drawing Sheets

Related U.S. Application Data continuation of application No. 09/972,929, filed on Oct. 10, 2001, now Pat. No. 7,457,750.

(60) Provisional application No. 60/240,324, filed on Oct. 13, 2000.

(51) Int. Cl.
 *G10L 15/10* (2006.01)
 *G10L 15/14* (2006.01)

(58) Field of Classification Search
 USPC .................... 704/243–244, 246, 251, 255
 See application file for complete search history.

(56) References Cited

U.S. PATENT DOCUMENTS

| | | | |
|---|---|---|---|
| 4,720,802 A | 1/1988 | Damoulakis et al. | |
| 5,008,941 A | 4/1991 | Sejnoha | |
| 5,072,415 A | 12/1991 | Cannelli et al. | |
| 5,148,489 A | 9/1992 | Erell et al. | |
| 5,199,077 A | 3/1993 | Wilcox et al. | |
| 5,276,765 A | 1/1994 | Freeman et al. | |
| 5,428,707 A | 6/1995 | Gould et al. | |
| 5,666,400 A | 9/1997 | McAllister et al. | |
| 5,719,921 A | 2/1998 | Vysotsky et al. | |
| 5,734,789 A | 3/1998 | Swaminathan et al. | |
| 5,778,336 A | 7/1998 | Chou et al. | |
| 5,804,729 A * | 9/1998 | Andersen | 73/609 |
| 5,832,063 A | 11/1998 | Vysotsky et al. | |
| 5,835,890 A | 11/1998 | Matsui et al. | |
| 5,839,101 A | 11/1998 | Vahatalo et al. | |
| 5,845,246 A | 12/1998 | Schalk | |
| 5,864,810 A | 1/1999 | Digalakis et al. | |
| 5,915,235 A | 6/1999 | DeJaco et al. | |
| 5,960,397 A | 9/1999 | Rahim | |
| 5,970,446 A | 10/1999 | Goldberg et al. | |
| 6,003,002 A | 12/1999 | Netsch | |
| 6,009,391 A | 12/1999 | Asghar et al. | |
| 6,026,359 A * | 2/2000 | Yamaguchi et al. | 704/256.4 |
| 6,029,124 A | 2/2000 | Gillick et al. | |
| 6,035,048 A | 3/2000 | Diethorn | |
| 6,157,670 A | 12/2000 | Kosanovic | |
| 6,163,768 A | 12/2000 | Sherrwood et al. | |
| 6,212,498 B1 | 4/2001 | Sherwood et al. | |
| 6,289,309 B1 | 9/2001 | deVries | |
| 6,327,345 B1 | 12/2001 | Jordan | |
| 6,377,927 B1 | 4/2002 | Loghmani et al. | |
| 6,389,393 B1 | 5/2002 | Gong | |
| 6,418,411 B1 | 7/2002 | Gong | |
| 6,487,530 B1 | 11/2002 | Lin et al. | |
| 6,529,586 B1 | 3/2003 | Elvins et al. | |
| 6,671,666 B1 * | 12/2003 | Ponting et al. | 704/233 |
| 6,687,669 B1 | 2/2004 | Schrogmeier et al. | |
| 6,691,091 B1 | 2/2004 | Cerisara et al. | |
| 6,766,295 B1 | 7/2004 | Murveit et al. | |
| 6,839,410 B2 | 1/2005 | Infosino | |
| 6,859,773 B2 | 2/2005 | Breton | |
| 6,920,421 B2 | 7/2005 | Pao | |
| 6,925,307 B1 | 8/2005 | Mamdani et al. | |
| 6,985,860 B2 | 1/2006 | Nakatsuka | |
| 7,016,837 B2 * | 3/2006 | Seo et al. | 704/233 |
| 7,050,974 B1 | 5/2006 | Komori et al. | |
| 7,089,182 B2 | 8/2006 | Souilmi et al. | |
| 7,139,393 B1 | 11/2006 | Murase | |
| 8,085,943 B2 * | 12/2011 | Bizjak | 381/71.14 |
| 2003/0033143 A1 | 2/2003 | Aronowitz | |

FOREIGN PATENT DOCUMENTS

| | | |
|---|---|---|
| EP | 0661860 | 7/1995 |
| EP | 0 913 809 A2 | 5/1999 |
| EP | 0 920 173 A2 | 6/1999 |
| EP | 0920173 | 6/1999 |
| JP | 11205451 | 7/1999 |

OTHER PUBLICATIONS

Acero A et al: "Speaker and gender normalization for continuous-density hidden Markov models" Proceedings IEEE International Conference on Acoustics, Speech, and Signal Processing (ICASSP '96), Atlanta, GA, USA, vol. 1, May 7-10, 1996, pp. 342-345, XP002121819.

Ishii J et al: "Speaker Normalization and Adaptation Based on Linear Transformation" Proceedings IEEE International Conference on Acoustics, Speech, and Signal Processing (ICASSP '97), Munich, Germany, vol. 2, Apr. 21-24, 1997, pp. 1055-1058, XP000822632.

* cited by examiner

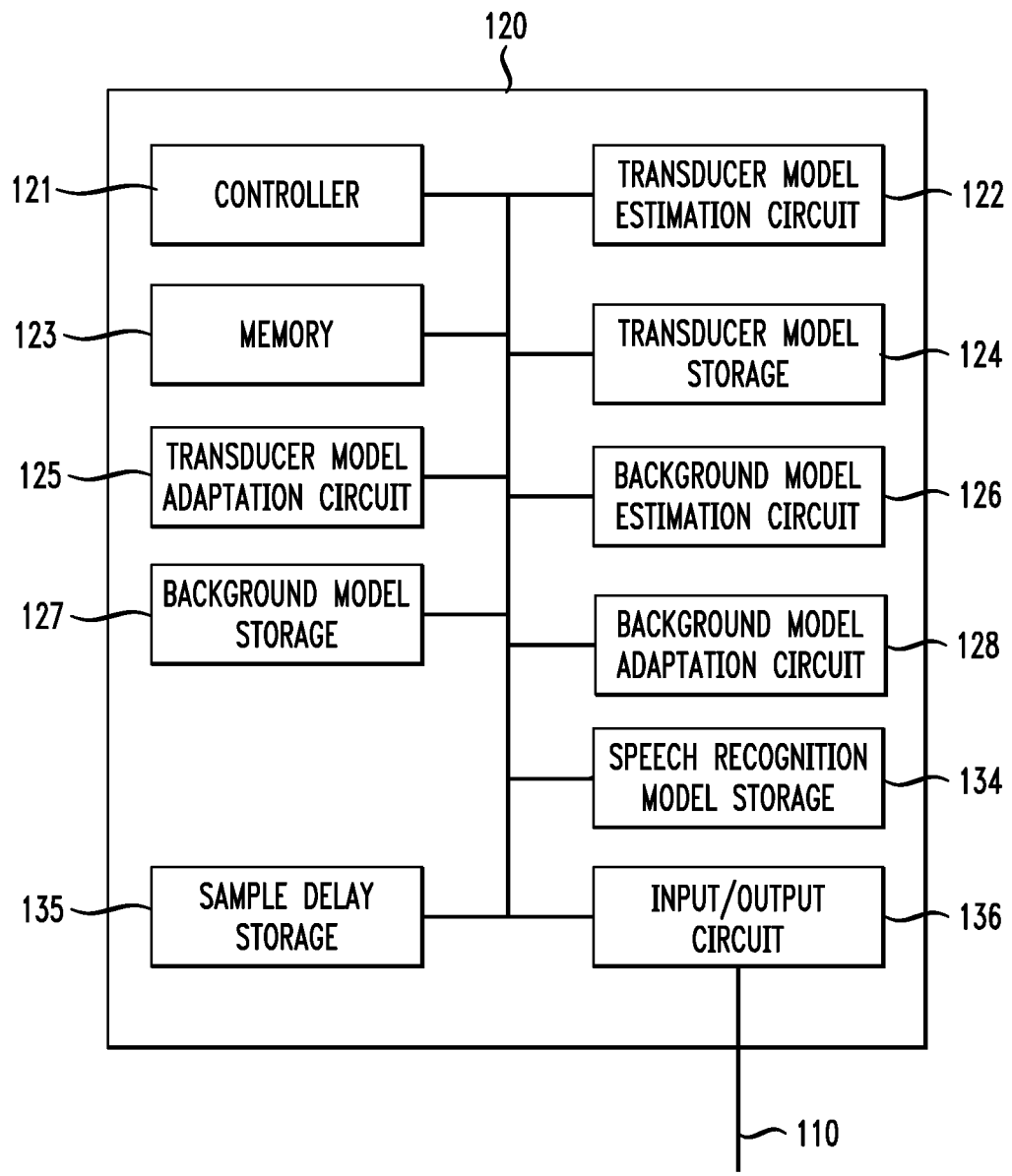

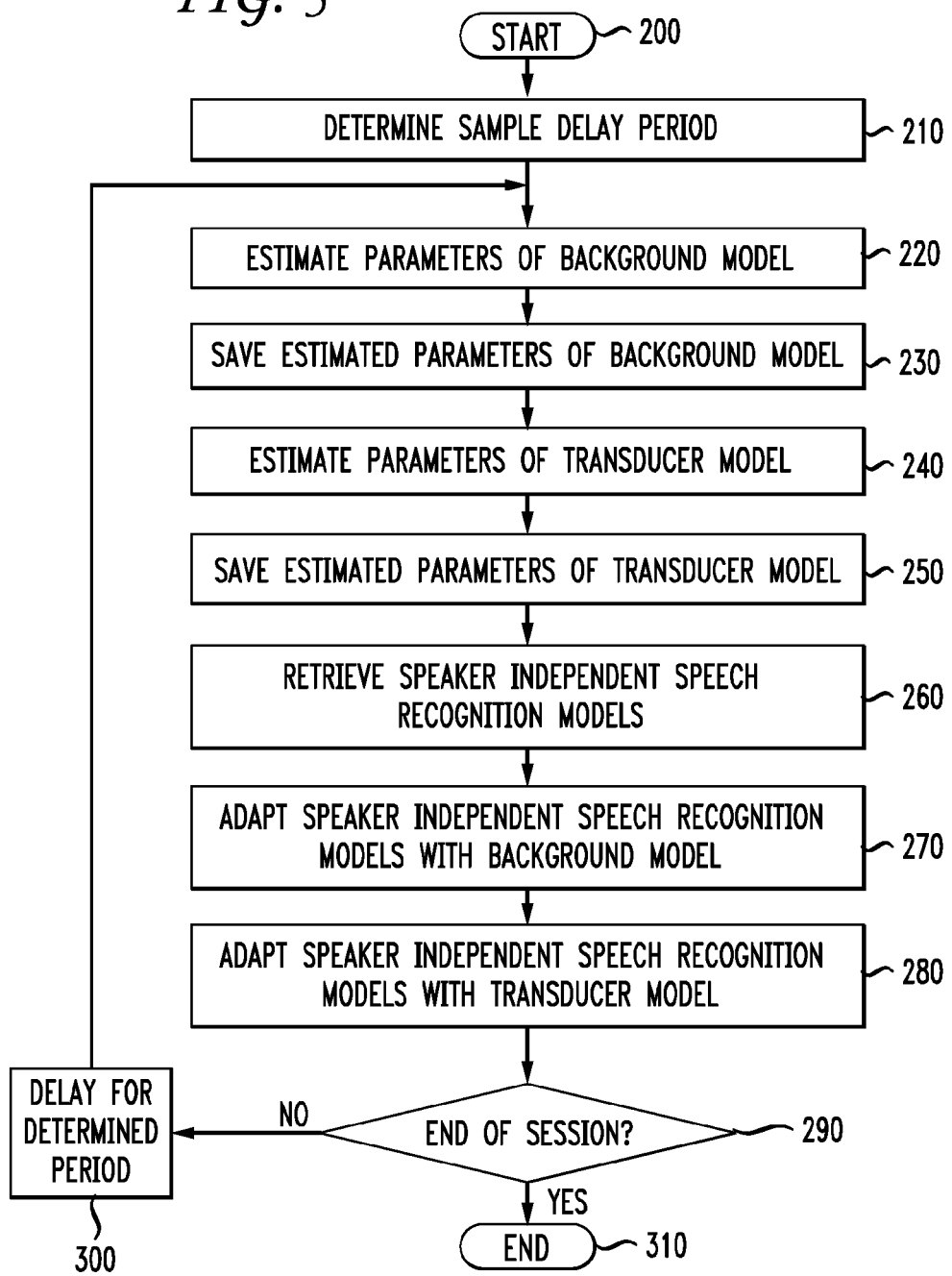

SYSTEMS AND METHODS FOR DYNAMIC RE-CONFIGURABLE SPEECH RECOGNITION

PRIORITY INFORMATION

The present application is a continuation of U.S. patent application Ser. No. 12/120,801, filed May 15, 2008, which is a continuation of U.S. patent application Ser. No. 09/972,929, filed Oct. 10, 2001, now U.S. Pat. No. 7,457,750, issued Nov. 25, 2008, which claims the benefit of U.S. Provisional Application No. 60/240,324, filed on Oct. 13, 2000, entitled "Hidden Markov Model Environmental Compensation for Automatic Speech Recognition on Hand Held", the contents of which are incorporated herein in their entirety.

BACKGROUND OF THE INVENTION

1. Field of Invention

This invention relates to a method and apparatus for automatic speech recognition.

2. Description of Related Art

Mobile device usage has increased as mobile devices can store more information and more information can be accessed over networks. However, conventional input methods for mobile devices such as web-enabled phones, personal communication systems, handheld personal digital assistants and other mobile devices is limited. For example, the size of keyboards on mobile devices is limited due to the need to make the mobile device as small and compact as possible.

Conventional limited size keyboards typically use multi-functions keys to further reduce size and space requirements. Multi-function keys are keys that depend on the selection of previous key sequences. Multi-function keys can be used to perform many different functions. However, when the number of additional functions increases, multi-function keyboards become difficult to use and the input method becomes error prone. Decreasing the size of keyboards with multi-function keys further increases the likelihood of mis-keying due to the smaller key size. Thus, decreased size multifunction keys are also error prone and difficult to use. Some manufacturers have attempted to address these problems with the use of predictive text entry input methods. For example, the T-9® predictive text entry system used in many web-enabled phones attempts to predict complete words as the keystrokes for each word are entered. However, the T-9® predictive text entry system mis-identifies words, is not easily adapted to words in different languages and requires the use of a keyboard and are not easy to use.

Some manufacturers of mobile devices have attempted to address keyboard input problems by increasing the size of the mobile device keyboard. For example, the Ericsson model R380 and R380s web-enabled phones are equipped with a flip-up keypad that reveals a larger touch sensitive screen for input functions. However, these touch sensitive screens are expensive, increase the likelihood of damage to the device, increase power requirements and therefore battery size and fail to provide the user with an input method that is easy to use.

Some personal digital assistant device manufacturers such as Palm and Handspring have attempted to address these limitations of conventional input methods by adding handwriting recognition software to their mobile devices such as personal digital assistants. However, handwriting recognition software is also error prone, requires that the user be trained to write in ways easily recognizable by the handwriting recognition software and fails to provide an input method that is easy to use.

Automatic speech recognition provides an easy to use input method for mobile devices. However, conventional speech recognition systems for mobile devices provide speech recognition on a specific device and require intervention by a user such as training If the user must replace a lost or damaged device with a new device, the new device must be retrained before use or the accuracy of the device is lessened. Also as the user's usage environment deviates from the training environment, the accuracy of the voice recognition will be affected.

Other conventional speech recognition systems use speaker independent models either in the device or in the network. However, these conventional speaker independent speech recognition devices do not automatically compensate for the changing environments and/or differing transducer response characteristics.

For example, each phone or web-enabled phone is likely to use a transducer having different response characteristics. The response characteristics associated with a head mounted transducer or microphone used in Internet telephony applications is likely to differ from a Jabra hands-free EarSet® microphone used by a hands-free mobile phone user. Conventional speech recognition systems assume each mobile device has the same response characteristics with the result that the accuracy of the speech recognition is reduced.

Similarly, for background noise, the user of an Internet telephony application will experience a quiet and predictable background noise environment while a user of a mobile phone will experience a constantly changing background noise environment. Conventional speech recognition systems assume each mobile device experiences the same background noise resulting in reduced accuracy of the speech recognition system.

SUMMARY OF THE INVENTION

Alternate modes of input for mobile devices that are easy to use and that require little user training would therefore be useful. In various exemplary embodiments according to this invention, individual transducer characteristics and specific background environmental noise characteristics are determined and used to adapt speech recognition models. Various other exemplary embodiments according to this invention also provide systems and methods for applying models of transducer characteristics and specific background environmental noise characteristics to speech recognition models such as speaker independent Hidden Markov Models.

BRIEF DESCRIPTION OF THE DRAWINGS

FIG. 4 shows an exemplary embodiment of a dynamic re-configurable speech recognition system according to this invention; and FIG. 5 is a flowchart of an exemplary method for dynamic re-configurable speech recognition according to this invention.

DETAILED DESCRIPTION OF EXEMPLARY EMBODIMENTS

Figure 1:
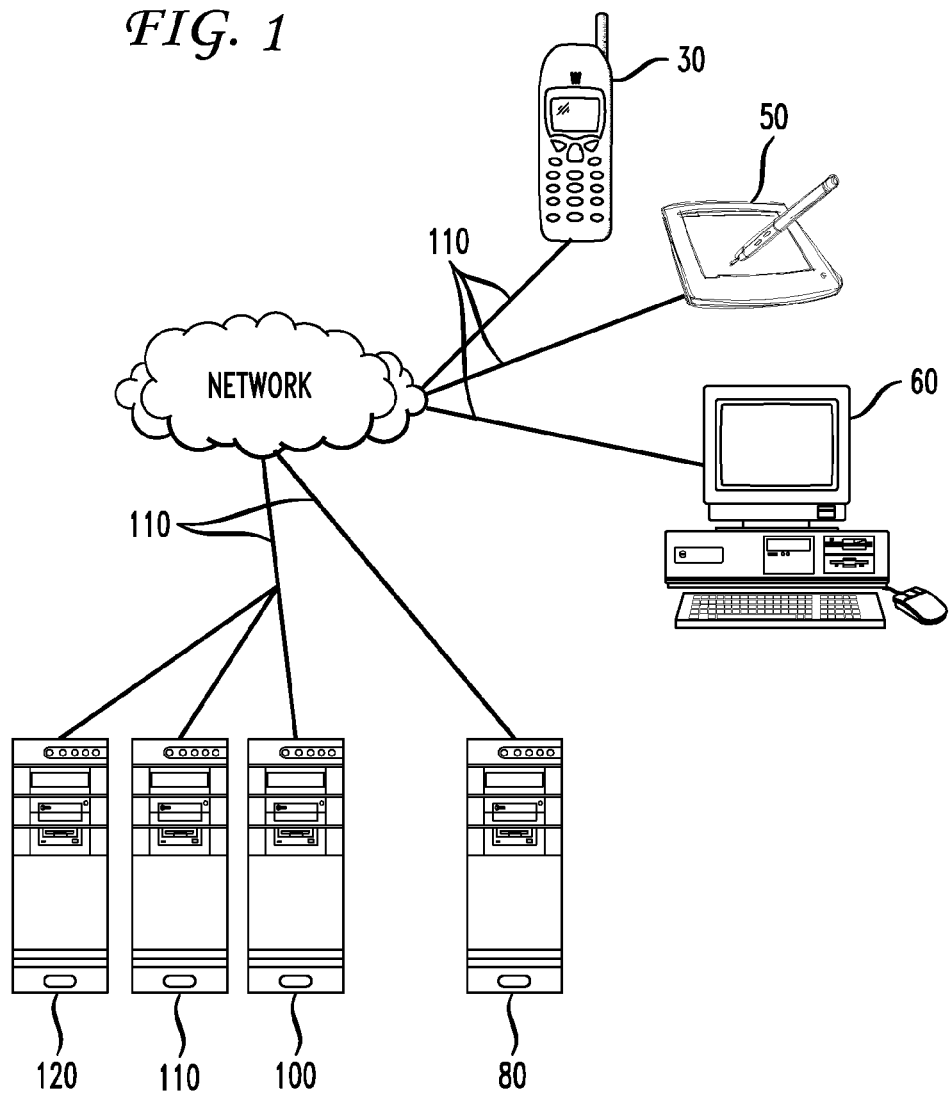
FIG. 1 is a general overview of a first embodiment of a dynamic re-configurable speech recognition system according to this invention.

FIG. 1 is a general overview of a first embodiment of a dynamic re-configurable speech recognition system according to this invention. Mobile phone 30, voice-enabled personal digital assistant 50, voice-enabled computer 60, web server 80, dialog server 100, automatic speech recognition server 110 and dynamic re-configurable speech recognition system 120 are each connected to communications link 110.

According to a first exemplary embodiment of this invention, a user of mobile phone 30 initiates a voice request for information from information repository, digital library or web server 80. The voice request is then forwarded to the dynamic re-configurable speech recognition system 120. The dynamic re-configurable speech recognition system 120 acts as a gateway or proxy that mediates access to information contained in the information repository, digital library or web server 80. For example, the information repository, digital library or web server 80 may encode the information encoded in HTML, PDF, XML and/or VXML pages or any other known or later developed encoding or formatting of information.

After receiving a voice request for information from mobile phone 30, the dynamic re-configurable speech recognition system 120 determines the identification of the user. Since most mobile devices are personal communication devices that are permanently assigned to a single user, a mobile device identifier may be used to identify the user. However, for shared mobile devices such as a shared phone used by several different people, a unique user code may be entered at the beginning of the usage session and transmitted with each voice request to identify the user to the dynamic re-configurable speech recognition system 120. Alternatively, the dynamic re-configurable speech recognition system 120 may dynamically adapt the mobile phone 30 to each additional user of the voice enabled phone 30. The user identifier may be based on rules associated with the phone such as time of day, day of the week or any other information or method of user identification without departing from the spirit or scope of this invention.

The dynamic re-configurable speech recognition system 120 retrieves speaker independent speech recognition models based on the user identification. For example, the dynamic re-configurable speech recognition system 120 may retrieve Hidden Markov Models of speech, neural networks parameters, reference templates or any other parameterizable speech recognition model. Based on a user identifier such as a user telephone number or terminal identifier, user specific transformations, background models and/or transducer models may be applied to generate a user specific speech recognition model. It will be apparent that the use of a Hidden Markov Models is merely exemplary and that any known or later developed speech recognition model may be used without departing from the spirit or scope of this invention.

The dynamic re-configurable speech recognition system 120 determines an estimate of the background noise parameters. The parameters of the background model are saved in storage for the user of mobile phone 30. An estimate of the noise introduced by the current transducer of mobile phone 30 is also generated and saved for the user of mobile phone 30. The background estimation and transducer estimation parameters of the background model and transducer model for the user of mobile phone 30 are used to adapt the speaker independent speech recognition model to the current background environment and transducer characteristics of the user of mobile phone 30.

The background and transducer adapted speaker independent speech recognition model for the user of mobile phone 30 and the voice request are forwarded to automatic speech recognition server 110.

The automatic speech recognition server 110 analyzes the voice request based on the background and transducer adapted speaker independent speech recognition model for the user of mobile phone 30. The dialog server 100 coordinates the required interactions with the user to create a query for the application. For example, the dialog server 100 may request that the user specify a middle initial or street name in a telephone directory application so that "John G. Smith" may be correctly distinguished from "John C. Smith" in the query results.

The voice request is translated into an information request such as a HTTP protocol request. The information request is forwarded to the information repository, digital library and/or web server 80. The web server 80 retrieves the requested information. The requested information such as a web page or query result is sent to a dialog server 100. The dialog server 100 translates the requested information into a spoken response. The speech is encoded onto the communications link 110 and sent to the mobile phone 30. The automatic speech recognition server 110, the dialog server 100, the dynamic re-configurable speech recognition system 120 and the information repository, digital library and/or web server 80 are shown as separate devices for discussion purposes. However, it will be apparent that in various other exemplary devices according to this invention, any one or more of the automatic speech recognition server 110, the dialog server 100, the dynamic re-configurable speech recognition system 120 and the information repository, digital library and/or web server 80 may be contained in a single device. Moreover, the automatic speech recognition server 110 may use any system or method of speech recognition capable of receiving speech recognition models or parameters.

Voice requests for information from a user of voice-enabled personal digital assistant 50 are similarly forwarded to dynamic re-configurable speech recognition system 120. The user of voice enabled personal digital assistant 50 is identified and based on the user identification information and the information in the voice-request, parameters of the background model and the transducer model are estimated. The user specific background model and transducer model are used to dynamically adapt the speaker independent speech recognition models at determined intervals. The speech recognition model is automatically and dynamically compensated with respect to background noise and transducer induced noise.

Figure 2:
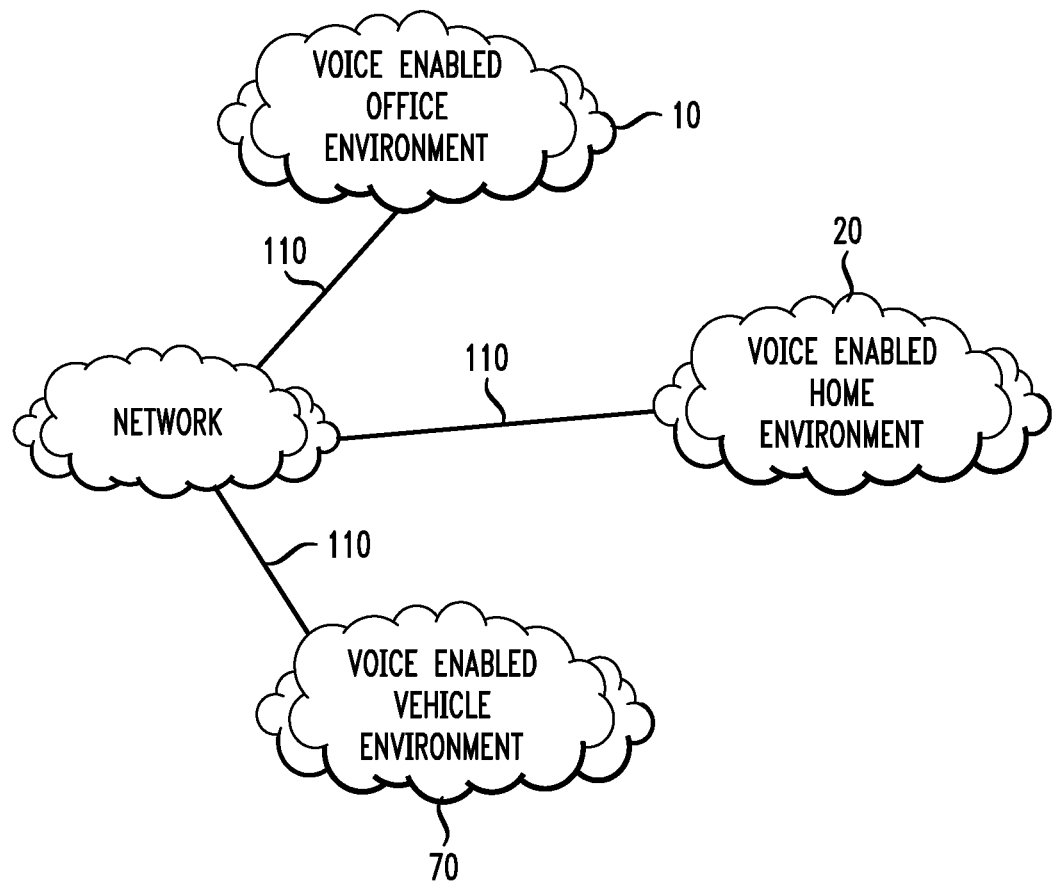
FIG. 2 is a general overview of exemplary environments in which mobile devices may be used according to this invention.

FIG. 2 is a general overview of exemplary environments in which mobile devices may be used according to this invention. In various alternative embodiments according to this invention, voice-requests from users may be received from a voice enabled office environment 10, voice enabled home environment 20 and/or voice enabled vehicle environment 70. For example, in a conference or seminar held in a voice enabled office environment 10, an office user may be associated with microphones in the voice enabled office environment. The dynamic re-configurable speech recognition system 120 (not shown) may be used to automatically apply appropriate adaptations for each microphone as the background noise environment changes. In various other exemplary embodiments according to this invention, identified users of the dynamic re-configurable speech recognition system 120 (not shown) in the voice enabled office environment 10 may initiate voice requests to display information from an information source accessible over communication link 110. Alternatively, the automatically recognized speech may be automatically transcribed for later printing, review and/or discussion.

Similarly, in a voice-enabled vehicle environment 70, the identified users of the voice enabled vehicle environment 70 may also request information such as map directions for head-up display, may adjust entertainment systems, temperature controls or any other system and/or device requiring input without departing from the spirit or scope of this invention.

Figure 3:
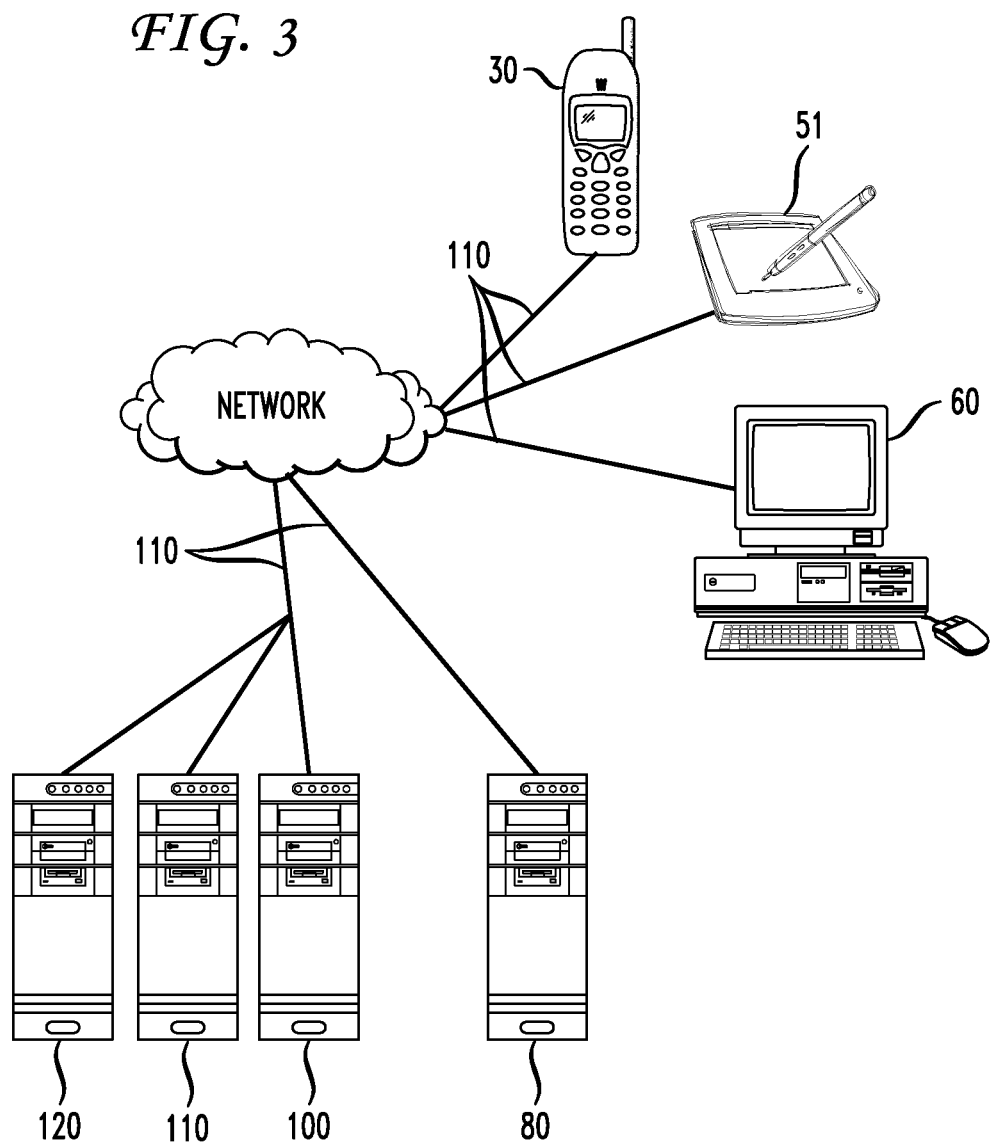
FIG. 3 is a general overview of a second embodiment of a dynamic re-configurable speech recognition system according to this invention.

FIG. 3 is a general overview of a second embodiment of a dynamic re-configurable speech recognition system according to this invention. Voice-enabled personal digital assistant 51 may directly incorporate a dialog server 100' (not shown), automatic speech recognition server 110' (not shown) and dynamic re-configurable speech recognition system 120' (not shown) to initiate voice requests for information over communications link 110 to web server 80. In contrast, voice-enabled computer 60, and web server 80 connected to communications link 110 initiate voice requests through dialog server 100, automatic speech recognition server 110 and dynamic re-configurable speech recognition system 120.

For example, voice-enabled personal digital assistant 51 may include a VisorPhone® peripheral attached to the Handspring Visor® personal digital assistant 51. The microphone of the VisorPhone® peripheral may have different microphone characteristics than the microphone contained in the Jabra EarSet®, or the Ericsson R380 or R380s smartphone discussed above. Since a different microphone has been selected, the same user may experience different effects from the background noise on the accuracy of the automatic speech recognition system. However in various exemplary embodiments according to this invention, the dynamic re-configurable speech recognition system 120' (not shown) contained within the personal digital assistant 51 dynamically adapts the speech recognition models based on the user's current transducer and background noise environment.

FIG. 4 shows an exemplary embodiment of a dynamic re-configurable speech recognition system 120. The dynamic re-configurable speech recognition system 120 includes a controller 121, transducer model estimation circuit 122, memory 123, transducer model estimation storage 124, transducer model adaptation circuit 125, background model estimation circuit 126, background model estimation storage 127, background model adaptation circuit 128, optional speech recognition model storage 134 and sample delay storage 135 each connected through input/output circuit 136 to communication link 110.

In a first exemplary embodiment according to this invention, a voice request for information is received over communications link 110. The controller 121 reads the sample delay storage 135 and based in the specified delay activates the background model estimation circuit 126 to determine the background noise environment of the voice request.

The background model estimation circuit 126 constantly determines the background model. For example, the background model estimation circuit 126 may sample the periods of speech inactivity to determine the parameters of the background noise environment for the user's current location. In various other exemplary embodiments, the sample delay may be set to a high sampling frequency to capture changes as the user traverses environments or as the user changes transducers. In various other exemplary embodiments, the sampling frequency may be set to reduce the number of samples.

A speech recognition model, such as a speaker independent Hidden Markov Model, is retrieved from storage. It will be apparent that the speech recognition model may be stored in a separate server, stored in optional speech recognition model storage 134 of the dynamic tunable speech recognition system 120 or in any location accessible via communications link 110.

The background model adaptation circuit 128 is activated to adapt the retrieved speech recognition model based on the results of the background model estimation circuit 126 for the user. In this way, compensation for the user's background noise environment is provided. The background model is stored in the background model storage 127. In various alternative embodiments, the background model may be stored in a configuration server (not shown) as further discussed in co-pending applications entitled "SYSTEMS AND METHODS FOR AUTOMATIC SPEECH RECOGNITION", U.S. patent application Ser. No. 09/966,249, filed Oct. 1, 2001, now U.S. Pat. No. 7,451,085 and U.S. patent application Ser. No. 09/966,081, filed Oct. 1, 2001, now U.S. Pat. No. 7,219,058, hereby incorporated by reference in their entirety. The configuration server may located in any other location accessible via communication link 110.

The controller 121 activates the transducer model estimation circuit 122 to determine a model of the transducer characteristics and to determine how the user's current transducer characteristics relate to the response characteristics of the transducers used to develop the speech recognition model. For example, the relationship between the user's actual transducer and the training transducer or microphone can be determined by determining an easily recognized word having low ambiguity in a received voice request. The predicted signal for the easily recognized low ambiguity word is compared with the background adapted signal for the easily recognized low ambiguity word. The relationship between the predicted and background adapted signals reflect the difference between the user's actual transducer and the transducers used during initial input. In various other exemplary embodiments, the response characteristics may be determined by polling the mobile device for transducer information, having the mobile device send new information when the transducer information changes, or using any other known or later developed supervised or unsupervised calibration process.

The controller 121 activates the transducer model adaptation circuit 125 to adapt the retrieved background adapted speech recognition model with the parameters of the transducer model. The transducer and background adapted speech recognition model compensates for the noise of the transducer used in each device. The estimated parameters of the transducer model are stored in the transducer model storage 124.

In various exemplary embodiments according to this invention, the frequency of background estimates and transducer estimates made is based on the specified sample delay storage 135. However, it will be apparent that in various other embodiments according to this invention, the sample delay may be set to a specific value, dynamically determined based on the frequency or magnitude of determined changes in the sampled information, sampled continuously or may employ any other known or later developed technique of sampling the background and transducer noise information without departing from the spirit or scope of this invention.

If the sample delay storage indicates that a sample has occurred within the period indicated by the sample value, the controller 121 may retrieve the background estimation from background model storage 127 and retrieves transducer estimations from transducer model storage 124.

In one exemplary embodiment according to this invention, the speech recognition models are retrieved from optional speech recognition model storage memory 134 into memory 123. The retrieved speech recognition models are then adapted by the background model estimation circuit 126 to compensate for background noise in the user's current environment. The transducer adaptation circuit 125 adapts the background adapted speech recognition models for transducer or microphone noise. The background and transducer adapted speech recognition models and the voice request are output by the input/output circuit 136 over communication link 110 to automatic speech recognition server 110. The automatic speech recognition server 110 dynamically determines the user's speech information in the received voice request based on background and transducer adapted speech recognition models.

FIG. 5 is a flowchart of an exemplary method for dynamic speech recognition according to this invention. The process begins at step 200, control is then immediately transferred to step 210.

In step 210 a sample delay period is determined. The sample delay period reflects the amount of time or delay that will occur between each sample of the background information and transducer information. In various exemplary embodiments of this invention, a specific sample delay may be set in a memory location, may be determined dynamically based on a degree of change determined between successive samples.

For example, a sample delay period may be increased as successive comparisons of the background estimation and the transducer estimation do not exceed a threshold value. As changes are detected between successive comparisons of the background estimations and transducer estimations, the sample delay period may be decreased to more quickly respond to future changes. Alternatively any known or later developed method of determining a sample delay may be used in the practice of this invention. After the sample delay period is determined, control is transferred to step 220.

In step 220, the parameters of the background noise in the user's environment is determined. The parameters of the background model may be estimated by comparing a sampled period of silence with a previously determined period of silence. The determined differences may be used to estimate the current background noise. However, it will be apparent that any known or later developed method of determining background noise may be used in the practice of this invention. Control is then transferred to step 230.

In step 230, the estimated parameters of the background model are saved. The estimated parameters may be saved in random access memory, flash memory, magnetic storage, magneto-optical storage or any other known or later developed storage medium. Control is then transferred to step 240.

The parameters of the transducer model are determined in step 240. The estimated parameters of the transducer model may indicate the users' type of microphone, the response characteristics of the microphone, head-mount characteristics, in-ear characteristics, equivalency to another microphone or any other information concerning the response of the microphone or transducer. In various alternative embodiments according to this invention, the parameters of the transducer may be determined dynamically. For example, after compensating for the background environment, the speech recognition model produced for un-ambiguous words may be dynamically compared to previously sampled un-ambiguous words to dynamically estimate parameters of the transducer model.

The transducer model is used to adjust for differing response characteristics of the transducers found in various devices. For example, the transducer response characteristics for a Jabra EarSet® microphone-earphone combination will differ from the response characteristics of a Sennheiser HMD410 headset and the transducer in an Ericsson R380s smartphone. The transducer model is based on the determined relationship between each user's actual transducer or microphone and the transducers or microphones used in developing the original speaker independent speech recognition model. After the parameters of the transducer model are estimated, control is transferred to step 250.

In step 250, the determined transducer model is saved. For example, the transducer model may be saved in random access memory, flash memory, magnetic storage, magneto-optical storage or any other known or later developed storage medium. Control is then transferred to step 260.

In step 260, a speech recognition model is retrieved. The retrieved speech recognition model may be a Hidden Markov Model, a neural network or any other known or later developed speech recognition model. In various exemplary embodiments, the speech recognition model may be retrieved from random access memory, flash memory, magnetic storage, magneto-optical storage or any other known or later developed storage medium. Control is then transferred to step 270.

In step 270, the speech recognition models are adapted with the determined background model retrieved from storage based on the user. In various other exemplary embodiments according to this invention, the background adapted speech recognition model for the user may be saved in memory. Control is transferred to step 280.

In step 280, the background adapted speech recognition model is adapted with a determined transducer model retrieved from storage based on the user. Control continues to step 290.

In step 290, a determination is made whether the user's voice request session has ended. If a user of a mobile device has initiated a session with a voice enabled information provider number such as TELLME Corporation, the termination of the user's call will coincide with the termination of the user's session. However, in various other exemplary embodiments, a user session may start before the user initiates a call to an information provider. For example, a network operator may voice-enable the initiation of a call to allow users to voice dial number in the network. In this case, the start of a user session will coincide with the start of network call initiation. In various other exemplary embodiments according to this invention, the dynamic speech recognition system may be used in second and third generation mobile networks. For example, GPRS always-on packet based networks may be used to carry the voice request information. In this case, a method of determining a user session might be a users' voice command to initiate a call or make a connection over the GPRS network. However, it will be apparent that any known or later developed method of determining a user session may be used without departing from the spirit or scope of this invention.

If the end of session is not determined in step 290, control is transferred to step 300 and the process is delayed for the sample delay period. The delay period may be set to a pre-determined value or may be adjusted dynamically. For example, the delay period may be based on detected changes in the background environment and/or the transducer environment. Control then continues to step 220 and the process continues until it is determined in step 290 that the user session has been terminated.

The user session may be terminated by the user pressing the "END" key of a voice-activated phone, turning off the device, by a voice-command such as a voice-off or any other known or later developed method of indicating an end of a user session. When a determination is made in step 290 that the user session has been terminated, control continues to step 310 and the process ends.

In the various exemplary embodiments outlined above, the dynamic re-configurable speech recognition system 120 can be implemented using a programmed general purpose computer. However, the dynamic re-configurable speech recognition system 120 can also be implemented using a special purpose computer, a programmed microprocessor or micro-controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 5 can be used to implement the dynamic re-configurable speech recognition system 120.

Each of the circuits 121-136 of the dynamic re-configurable speech recognition system 120 outlined above can be implemented as portions of a suitably programmed general purpose computer. Alternatively, circuits 121-136 of the dynamic re-configurable speech recognition system 120 outlined above can be implemented as physically distinct hardware circuits within an ASIC, or using a FPGA, a PDL, a PLA or a PAL, or using discrete logic elements or discrete circuit elements. The particular form each of the circuits 121-136 of dynamic re-configurable speech recognition system 120 outlined above will take is a design choice and will be obvious and predicable to those skilled in the art.

Moreover, dynamic re-configurable speech recognition system 120 and/or each of the various circuits discussed above can each be implemented as software routines, managers or objects executing on a programmed general purpose computer, a special purpose computer, a microprocessor or the like. In this case, dynamic re-configurable speech recognition system 120 and/or each of the various circuits discussed above can each be implemented as one or more routines embedded in the communications network, as a resource residing on a server, or the like. The dynamic re-configurable speech recognition system 120 and the various circuits discussed above can also be implemented by physically incorporating dynamic re-configurable speech recognition system 120 into a software and/or hardware system, such as the hardware and software systems of a voice-enabled device.

As shown in FIG. 4, the memory 123, the transducer model storage memory 124, the background model storage memory 127, and/or the sample delay storage memory 135 can each be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 110 shown in FIGS. 1-4 can each be any known or later developed device or system for connecting a communication device to the dynamic re-configurable speech recognition system 120, including a direct cable connection, a connection over a wide area network or a local area network, a connection over an intranet, a connection over the Internet, or a connection over any other distributed processing network or system. In general, the communication links 110 can each be any known or later developed connection system or structure usable to connect devices and facilitate communication.

Further, it should be appreciated that the communication link 110 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method comprising:
    generating a user identifier using a voice request, the voice request received from a device;
    estimating, via successive comparisons, a transducer noise parameter of the device, wherein a delay between the successive comparisons is increased when successive changes do not exceed a threshold value;
    comparing stored user identities to the user identifier, to yield a comparison;
    when, based on the comparison, a user is associated with the device:
        retrieving a parameterizable speech recognition model associated with the user identifier; and
        adapting the parameterizable speech recognition model based on the transducer noise parameter to yield an adapted parameterizable speech recognition model; and
        performing speech recognition on the voice request using the adapted parameterizable speech recognition model.

2. The method of claim 1, wherein the parameterizable speech recognition model is speaker independent.

3. The method of claim 2, wherein generating of the user identifier occurs after receiving a unique user code in the voice request.

4. The method of claim 1, wherein the parameterizable speech recognition model is generated based on a background model, a transducer model, and the user identifier.

5. The method of claim 1, further comprising estimating, via successive comparisons, a background noise parameter.

6. The method of claim 5, wherein the adapting of the parameterizable speech recognition model is further based on the background noise parameter.

7. A system comprising:
    a processor; and
    a computer-readable storage medium having instructions stored which, when executed by the processor, cause the processor to perform operations comprising:

generating a user identifier using a voice request, the voice request received from a device;

estimating, via successive comparisons, a transducer noise parameter of the device, wherein a delay between the successive comparisons is increased when successive changes do not exceed a threshold value;

comparing stored user identities to the user identifier, to yield a comparison;

when, based on the comparison, a user is associated with the device:

retrieving a parameterizable speech recognition model associated with the user identifier; and adapting the parameterizable speech recognition model based on the transducer noise parameter to yield an adapted parameterizable speech recognition model; and performing speech recognition on the voice request using the adapted parameterizable speech recognition model.

8. The system of claim 7, wherein the parameterizable speech recognition model is speaker independent.

9. The system of claim 8, wherein generating of the user identifier occurs after receiving a unique user code in the voice request.

10. The system of claim 7, wherein the parameterizable speech recognition model is generated based on a background model, a transducer model, and the user identifier.

11. The system of claim 7, the computer-readable storage medium having additional instructions which result in operations comprising estimating, via successive comparisons, a background noise parameter.

12. The system of claim 11, wherein the adapting of the parameterizable speech recognition model is further based on the background noise parameter.

13. A computer-readable storage device having instructions stored which, when executed by a computing device, cause the computing device to perform operations comprising:

generating a user identifier using a voice request, the voice request received from a device;

estimating, via successive comparisons, a transducer noise parameter of the device, wherein a delay between the successive comparisons is increased when successive changes do not exceed a threshold value;

comparing stored user identities to the user identifier, to yield a comparison;

when, based on the comparison, a user is associated with the device:

retrieving a parameterizable speech recognition model associated with the user identifier; and adapting the parameterizable speech recognition model based on the transducer noise parameter to yield an adapted parameterizable speech recognition model; and performing speech recognition on the voice request using the adapted parameterizable speech recognition model.

14. The computer-readable storage device of claim 13, wherein the parameterizable speech recognition model is speaker independent.

15. The computer-readable storage device of claim 14, wherein generating of the user identifier occurs after receiving a unique user code in the voice request.

16. The computer-readable storage device of claim 13, wherein the parameterizable speech recognition model is generated based on a background model, a transducer model, and the user identifier.

17. The computer-readable storage device of claim 13, having additional instructions which result in operations comprising estimating, via successive comparisons, a background noise parameter.

18. The system of claim 11, wherein the adapting of the parameterizable speech recognition model is further based on the background noise parameter.

* * * * *